A. H. TIMMERMAN, E. L. COOLIDGE & S. SPARROW.
APPARATUS FOR STARTING INTERNAL COMBUSTION ENGINES.
APPLICATION FILED OCT. 25, 1912.

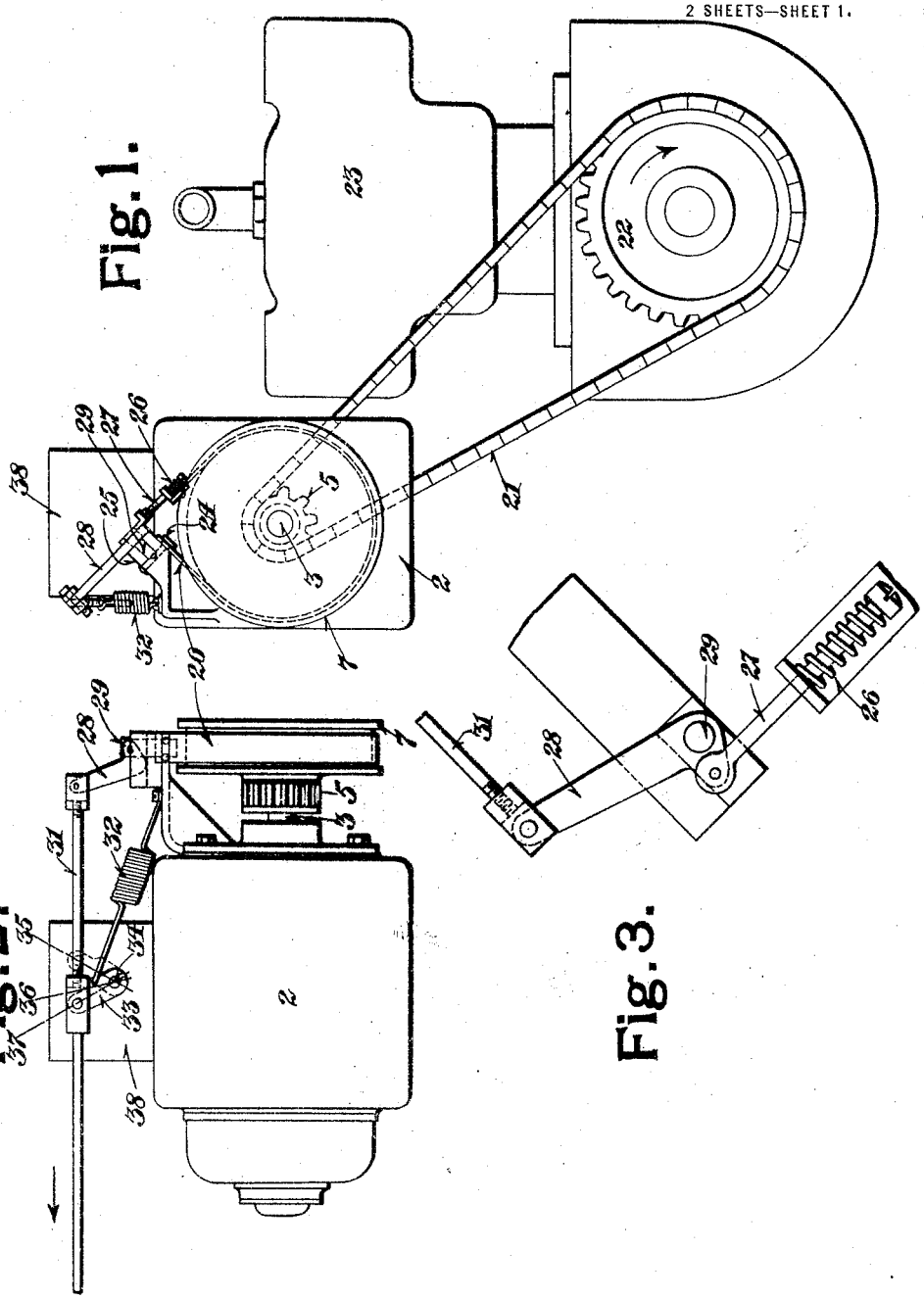

1,187,111.

Patented June 13, 1916.
2 SHEETS—SHEET 2.

WITNESSES:
Chas. A. Becker
J. M. Short

INVENTORS:
A. H. Timmerman,
E. L. Coolidge and
Simon Sparrow,
BY
E. E. Huffman
ATTORNEY.

UNITED STATES PATENT OFFICE.

ARTHUR H. TIMMERMAN, EDWARD L. COOLIDGE, AND SIMON SPARROW, OF ST. LOUIS, MISSOURI, ASSIGNORS TO WAGNER ELECTRIC MANUFACTURING COMPANY, OF ST. LOUIS, MISSOURI, A CORPORATION OF MISSOURI.

APPARATUS FOR STARTING INTERNAL-COMBUSTION ENGINES.

1,187,111.     Specification of Letters Patent.     Patented June 13, 1916.

Application filed October 25, 1912. Serial No. 727,712.

*To all whom it may concern:*

Be it known that we, ARTHUR H. TIMMERMAN, EDWARD L. COOLIDGE, and SIMON SPARROW, citizens of the United States of America, residing at the city of St. Louis, State of Missouri, have invented a certain new and useful Apparatus for Starting Internal-Combustion Engines, of which the following is such a full, clear, and exact description as will enable any one skilled in the art to which it appertains to make and use the same, reference being had to the accompanying drawings, forming part of this specification.

Our invention relates to apparatus adapted to start internal combustion engines and to operate in conjunction therewith for generating electrical energy.

It is particularly applicable to automobiles driven by gasolene engines, and comprises, in general, a dynamo electric machine, a storage battery, and means for connecting the dynamo electric machine to the engine.

It is the object of the invention to provide a self-recuperative apparatus, *i. e.*, one in which the energy consumed in starting the engine and in supplying the lights and ignition system of the vehicle will be restored to the storage battery when the engine operates under its own power; and further to produce an apparatus of this character which will be of small dimensions, positive in action and efficient and simple in operation.

Figure 5:
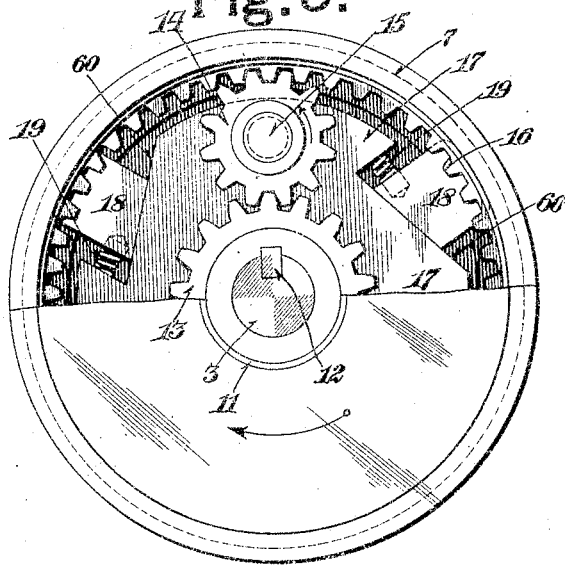
Figure 4:
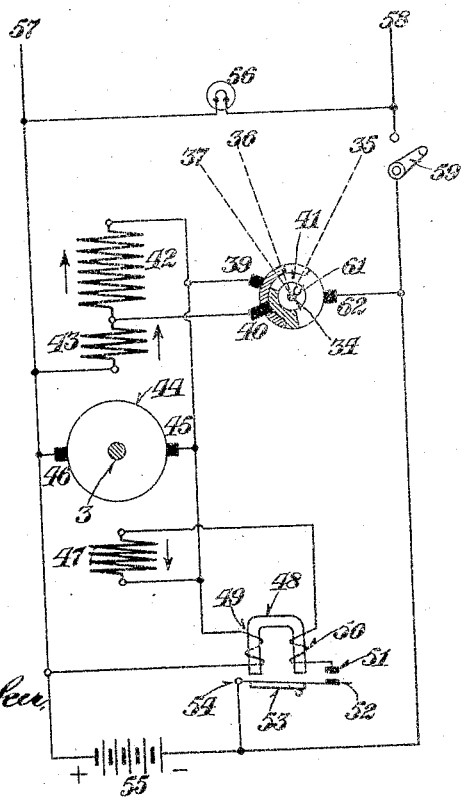

Referring to the drawings which illustrate one embodiment of our invention, Figure 1 is an end view showing the dynamo electric machine, the engine and the devices connecting them; Fig. 2 is a side view of the dynamo electric machine and a portion of the connecting devices; Fig. 3 is a plan view of the brake controlling lever and connections; Fig. 4 illustrates one suitable arrangement of the electrical circuits between the dynamo electric machine, the storage battery and the starting switch; Fig. 5 is an end view, and Fig. 6 a side view, each partly in section, of the gearing forming a part of the connections between the dynamo electric machine and engine.

Like marks of reference indicate like parts in the several figures.

Figure 6:
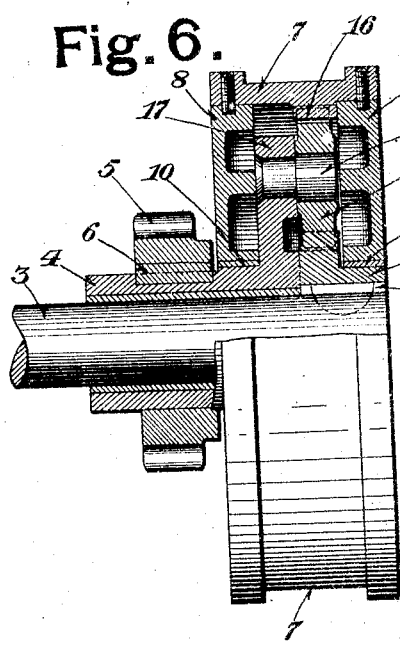

2 is the dynamo electric machine provided with a shaft 3 carrying the pinion 13 bound to said shaft by means of the key 12, as most clearly shown in Figs. 5 and 6. This pinion engages with the planet wheels 14, of which there are preferably three, mounted on the pins 15 carried by a rotative member comprising the disk or flange like projection 17 and the sleeve 4 loosely mounted on the shaft 3. The planet wheels 14 also engage with the internal gear or rack teeth 16 forming part of the shell inclosing the gearing. This shell consists of the disks 8 and 9 and the annular piece or rim 7 adapted to accommodate the band brake 20, as shown in Figs. 1 and 2. This shell or casing is free to revolve about the shaft 3, for it is centered on the sleeve 4 and on the pinion 13 by means of rings or sleeves 10 and 11 of suitable material. The flange 17 which carries the planet wheels 14 and forms part of the sleeve 4 is of considerably smaller diameter than the bore of the rim 7, but can, nevertheless, engage said rim by means of wedges 18 contacting with the inner side of the rim 7 and also with the flat surfaces 60 provided near the periphery of the flange 17. These surfaces form a small angle with the tangent to the bore of the rim 7 at the middle point of contact between said rim and the wedges 18. The wedges 18 are forced into contact with the bore of the rim 7 and with the surfaces 60 of the flange 17 by means of springs 19 resting against projections of the flange 17, as clearly shown in Fig. 5. The sleeve 4 which is loosely mounted on the shaft 3 but is geared to it by means of the planet wheels 14 and the pinion 13, carries a pinion 5 connected to it by means of the key 6. A chain 21 connects the pinion 5 to the wheel 22 mounted on the shaft of the engine 23.

One end of the brake band 20 coöperating with the rim 7 is attached to a projection 25 of the frame of the dynamo electric machine 2 by means of the rivet 24. The other end of this brake is resiliently connected to the short arm of lever 28, pivoted at 29, by means of the link or rod 27 and the spring 26. The long arm of the lever 28 is connected to rod 31 to which is also connected the lever 33 which operates the switch or controller to reorganize the connections between the storage battery and the dynamo electric machine, in the manner indicated in Fig. 4, by moving the drum 61 attached to the same pivot or shaft 34. The spring 32 attached to the frame of the dynamo electric machine and also to the lever 33, always tends to bring the latter back to position 35, thus releasing the tension on the band brake. The rod 31 is actuated in any desired manner by the operator.

When the operator releases the rod 31, allowing the spring 32 to release the brake and to bring the lever 33 into the running position 35, then the electrical connections are as shown in Fig. 4, the position of the drum 61 shown in that figure corresponding to the position 35 of the lever 33 of Fig. 2. It is seen that the storage battery 55 can be connected to the consumption circuit 57, 58, comprising translating devices such as 56, by means of the switch 59. The positive pole of this battery is connected to the brush 46 coöperating with the commuted winding 44 of the armature and also to one end of the shunt winding 43. The other end of this winding is connected by way of the winding 42 to the brush 45 coöperating with the commuted winding 44. The shunt winding 49 of the automatic switch 48 is connected across the brushes 45, 46, and the brush 45 is connected to the contact 51 of the automatic switch through the series winding 50 of the automatic switch 48. The negative pole of the battery is connected to the movable contact 52 of the automatic switch 48 by way of the movable armature 53 thereof pivoted at 54. The contact 41 is so shaped and so located on the drum 61 that when the operator moves the rod 31 in the direction of the arrow shown in Fig. 2 and the lever 33 reaches the position 36, the negative terminal of the battery 55 is connected to the brush 45 by way of the contacts 62 and 39; to the shunt winding 43 by way of the contacts 62 and 40; and the contacts 39 and 40 are short-circuited. When the lever 33 reaches its position 36, the tension on the band brake 20 is still very small and allows of practically free rotation of the casing 7 inclosing the planetary gear. The connections established by the drum 61 at this point, therefore, enable the dynamo electric machine to start as a motor with practically no load, being driven from the storage battery. It is only after the operator has increased the pull on the rod 31 and brought the lever 33 into the position 37, that the band brake is tightened and holds the casing 7. The movement of the lever 33 from position 36 to 37 does not alter the electrical connections.

When the engine is standing still, then there will be no E. M. F. at the brushes 45, 46 of the dynamo electric machine, and consequently no current in the shunt winding 49 of the automatic switch 48. This switch will be open, as shown in Fig. 4, and the storage battery 55 will be the only source available for feeding the consumption circuit 57, 58.

The operation of the apparatus will now be described somewhat more in detail. Assuming the spring 32 to be in full control, the lever 33 will stand in position 35 and the band brake 20 will hang loosely about the casing 7. The drum 61 of Fig. 4 will stand in the position shown in that figure. When the engine 23 is running in a clockwise direction, as shown in Fig. 1, then it will drive the sleeve 4 and the flange 17 by way of the wheel 22, the chain 21 and the pinion 5, while the flange 17 will drive the pinion 13 and, therefore, the shaft 3, by way of the planet wheels 14, the wedges 18 and the casing 7. Under these conditions, the gear ratio between the shaft 3 and the engine shaft will only depend on the relative number of teeth on the pinion 5 and the wheel 22. The direction of rotation of the pinion 13 will also be clockwise. One suitable ratio for the wheels 5 and 22 is 3 to 1. The reason why the engine will drive the shaft 3 at a speed depending on the ratio of the wheels 22 and 5, can best be explained by reference to Fig. 5. The pinion 13 coupled to the shaft 3 carrying the armature of the dynamo electric machine will naturally have a certain amount of inertia. Furthermore, when once set in motion, it will require a certain amount of torque to keep it running, owing to friction and to the fact that the dynamo will very soon become self-exciting. For all these reasons the pinion 13 will tend to remain at rest, with the result that when the flange 17 forming part of the sleeve 4 is set in motion by the engine, in a clockwise direction, the planet wheels 14 pivoted on the shafts 15 attached to the flange 17 will tend to roll on the pinion 13 and also to revolve clockwise about their shafts 15. This rotation of the pinions 14 will cause the rim 7 to move in a clockwise direction at a greater speed than the flange 17, for the reason that it is impelled in that direction not only by the rolling of the planets 14 on the pinion 13, but also by the revolution of these planet wheels on their shafts 15. As soon as the rim 7 moves in a clockwise direction, but faster than the flange 17, then the wedges 18 are also propelled in this direction by friction, and immediately lock the rim 7 to the flange 17. As soon as these two members of the gear are locked, then all relative movement between the rack 16 carried by the rim 7 and the planets 14 must cease and these planets must now drive the pinion 13 as if they were cast solid with it. As the engine speed increases, the dynamo electric machine gradually "picks up" and sends an ever increasing current through the shunt winding 49 of the automatic switch 48. This winding is so adjusted that the movable armature 53 is attracted and connects the contacts 51 and 52 as soon as the dynamo voltage has reached a value approximately equal to the normal voltage of the storage battery 55. After this, a further increase of the engine speed will cause the dynamo to send a charging current into the storage battery 55. This current circulating through the series coil 50 of the automatic switch 48 will increase the magnetization of the latter, keeping the armature 53 in place. The series winding 47 opposing the shunt magnetization due to the shunt windings 42 and 43 is one way of limiting the current output of the dynamo and thus projecting the storage battery. Should the engine speed decrease instead of increasing after the automatic switch 48 has operated, then the voltage of the storage battery 55 will very soon overpower the voltage generated in the dynamo and send a reverse current through the latter. This reverse current will have to flow through the series winding 50, opposing the magnetization produced by 49, reducing the total magnetization of the automatic switch and causing the armature thereof to drop away, thus interrupting the charging circuit.

When it is desired to start the engine, the operator pulls the rod 31 in the direction of the arrow shown in Fig. 2. As soon as the lever 33 has reached the position 36, the drum 61 will have reached a position in which the low resistance shunt winding 43 and the armature 44 are connected in parallel circuits across the terminals of the storage battery 55. Under these conditions, the dynamo electric machine will operate as a motor and will start rapidly with a powerful torque, and the connections are so arranged that it will drive the pinion 13 in a clockwise direction. This movement of pinion 13 will cause the planets 14 to revolve in a counterclockwise direction about their shafts 15, and because these planets are geared to the casing 7, which has a certain amount of inertia, the revolution of 13 will also cause the flange 17, on which the planets are mounted, to at least tend to revolve in a clockwise direction. Reference to Fig. 5 will show that with the casing 7 revolving counterclockwise and with the flange 17 either revolving clockwise or tending to so revolve, the wedges 18 will be inoperative, the friction between said wedges and the casing 7 tending to compress the springs 19 and to thus disengage the wedges. As a matter of fact, the flange 17 will remain stationary after possibly moving through a small angle, because it is directly geared to the engine and the latter requires a very powerful torque in order to move it. If the operator now increases his pull on the rod 31 and gradually brings the lever 33 into the position 37, he thereby tightens the brake band 20, and the leverages are so chosen that he is able, with little effort, to bring the casing 7 to rest and to hold it stationary. As the speed of counterclockwise revolution of the casing is diminished by the application of the brake, so the torque impelling the flange 17 in a clockwise direction becomes greater and greater. At least by the time the casing 7 is brought to rest, the torque is sufficient to start the engine. With the casing 7 held fast and with the pinion 13 revolving in a clockwise direction, the planets 14 are forced to revolve about their shafts 15 in a counter-clockwise direction and also to move about the center of the pinion 13 in a clockwise direction. The rate of this latter motion, of course, depends on the relative number of teeth in the gears, and we have found it convenient to so choose these proportions as to introduce a ratio of $\frac{3}{10}$ to 1 between the shaft 3 and the pinion 5. Since the ratio between the pinion 5 and engine was chosen 3 to 1, it follows that when the motor drives the engine through the planetary gearing and by way of the chain 21, then the gear ratio between the motor shaft and the engine shaft is 10 to 1, thus permitting of a comparatively small motor developing a sufficient torque to start the engine.

As has already been explained, the wedges 18 readily permit of the rim 7 being held fast and of the flange 17 being revolved in a clockwise direction, the friction between said wedges and the rim 7 tending to keep these wedges out of engagement. Should the engine "back fire", the rotative member comprising the flange 17 and the sleeve 4, is momentarily propelled in an anti-clockwise direction, the wedges 18 become operative, the engine torque is transmitted by them to the casing 7 and causes the latter to slip within the band brake, thus limiting the shock on the teeth of the gear. When the engine begins to run under its own power, it is only necessary for the operator to release the rod 31 allowing the lever 33 to return into the running position 35, thereby establishing the electrical running conditions already discussed in connection with Fig. 4, and releasing the band brake. As soon as this band brake is released, the casing 7 begins to revolve in a clockwise direction at an ever increasing speed, reaches the speed at which the flange 17 is revolving in that direction and very soon exceeds that speed. As soon as the speed of the rim 7 has exceeded that of the flange 17 by a sufficient amount, the wedges 18 come into play, and lock the rim 7 to the flange 17, thus cutting out the reduction of $\frac{3}{10}$ to 1 introduced by the planetary gear, thereby limiting the maximum speed of the dynamo electric machine to three times that of the engine.

As heretofore pointed out, the lever 28 is connected with the brake band through spring 26. Should the operator not release the brake rod 31 just at the moment the engine starts, the casing 7 will nevertheless be permitted to readily slip under the brake band by reason of the fact that its direction of rotation is such as to tend to stretch the spring 26 and thereby lessen the friction between the casing 7 and the brake band.

It will be understood that the particular type of dynamo electric machine illustrated forms no part of the invention and that any suitable type of such machine may be used.

Having fully described our invention, what we claim as new and desire to secure by Letters-Patent of the United States is:

1. In combination, a motor-dynamo shaft, an engine shaft, connecting devices adapted to transmit power at a certain speed ratio from the engine shaft to the motor-dynamo shaft, and means under the control of the operator for rendering said connecting devices operative to transmit power from the motor-dynamo shaft to the engine shaft and at a speed ratio different from that existing when power is transmitted from the engine shaft to the motor-dynamo shaft.

2. In combination, a motor-dynamo shaft, an engine shaft, connecting devices between the motor-dynamo shaft and engine shaft comprising a gear member so mounted as to be capable of both rotative and bodily movement, and means normally preventing rotative movement of said gear member when power is transmitted from the engine shaft to the motor-dynamo shaft.

3. In combination, a motor-dynamo shaft, an engine shaft, connecting devices between the motor-dynamo shaft and engine shaft comprising a loosely mounted gear, a rotative member, a pinion carried thereby in mesh with said gear, and means normally preventing relative motion between the rotative member and the loosely mounted gear when power is transmitted from the engine shaft to the dynamo shaft.

4. In combination, a motor-dynamo shaft, an engine shaft, connecting devices between the motor-dynamo shaft and engine shaft, comprising a loosely mounted gear, a rotative member, a pinion carried thereby in mesh with said gear, means normally preventing relative motion between the rotative member and the loosely mounted gear when power is transmitted from the engine shaft to the dynamo shaft, and means under the control of the operator for preventing rotation of the loosely mounted gear.

5. In combination, a motor-dynamo shaft, an engine shaft, connecting devices between the motor-dynamo shaft and the engine shaft comprising a loosely mounted gear, a rotative member, a pinion carried thereby in mesh with said gear, means normally preventing relative motion between the rotative member and the loosely mounted gear when power is transmitted from the engine shaft to the dynamo shaft, and a brake for the loosely mounted gear.

6. In combination, a motor-dynamo shaft, an engine shaft, connecting devices between the motor-dynamo shaft and engine shaft comprising an internal gear, a rotative member, a pinion carried thereby in mesh with said internal gear, and clutching means normally preventing relative motion between the rotative member and the internal gear when power is transmitted from the engine shaft to the dynamo shaft.

7. In combination, a motor-dynamo shaft, an engine shaft, connecting devices between the motor-dynamo shaft and engine shaft comprising an internal gear, a rotative member, a pinion carried thereby in mesh with said internal gear, clutching means normally preventing relative motion between the rotative member and the internal gear when power is transmitted from the engine shaft to the dynamo shaft, and a brake for the internal gear.

8. In combination, a motor-dynamo shaft, an engine shaft, means for connecting the motor-dynamo shaft and the engine shaft comprising a loosely mounted gear, a brake therefor, brake operating means, a yielding connection between the operating means and the brake, and means tending to hold the brake in released position.

9. In combination, a motor-dynamo shaft, an engine shaft, connecting devices between the engine-shaft and motor-dynamo shaft comprising a loosely mounted gear, a rotative member, a pinion carried thereby in mesh with said gear, a wedge carried by the rotative member and adapted to contact with a surface of the loosely mounted gear, and resilient means tending to hold the wedge in operative position.

10. In combination, a motor-dynamo shaft, an engine shaft, connecting devices between the motor-dynamo shaft and engine shaft comprising an internal gear, a rotative member, a pinion carried thereby in mesh with said internal gear, a sliding wedge seated in a recess in the rotative member and adapted to contact with a surface of the internal gear, and means under the control of the operator for preventing rotation of the internal gear.

11. The combination with a motor-dynamo shaft and an engine shaft, of connecting devices interposed therebetween, said connecting devices comprising a pinion permanently connected to the motor-dynamo shaft, a rotative member loosely mounted on said shaft and suitably connected to the engine shaft, an internal gear also loosely mounted on the motor-dynamo shaft, a pinion carried by the rotative member and meshing with the pinion on the motor-dynamo shaft and with the internal gear, means whereby rotation of the internal gear may be prevented when desired, and means normally preventing relative movement between the internal gear and the rotative member when power is transmitted from the engine shaft to the motor-dynamo shaft.

12. The combination with a motor-dynamo shaft, of an engine shaft, connecting devices between the motor-dynamo shaft and engine shaft comprising a pinion on the motor-dynamo shaft, a rotative member loosely mounted on said shaft, a planet wheel carried by the rotative member and meshing with said pinion, a loosely mounted casing provided with a clutching surface and with an internal gear meshing with the planet wheel, a clutching wedge adapted to coöperate with the casing and the rotative member, a brake for the casing, and means for connecting the rotative member to the engine shaft.

13. In combination, a motor-dynamo shaft, an engine shaft, connecting devices adapted to transmit power from the engine shaft to the motor-dynamo shaft, and means under the control of the operator for rendering said connecting devices operative to transmit power from the motor-dynamo shaft to the engine shaft.

14. In epicyclic gearing, the combination of a rotative member, a pinion carried thereby, a loosely mounted gear wheel in mesh with said pinion, a second gear wheel in mesh with the pinion, and means for automatically locking together the loosely mounted gear wheel and the rotative member, the operation of said means being dependent upon the direction of rotation of the rotative member.

15. In epicyclic gearing, the combination of a rotative member, a pinion carried thereby, a loosely mounted gear wheel in mesh with said pinion, a brake for said gear, a second gear wheel in mesh with the pinion and means for automatically locking together the loosely mounted gear wheel and the rotative member, the operation of said means being dependent upon the direction of rotation of the rotative member.

In testimony whereof we have hereunto set our hands and affixed our seals in the presence of the two subscribing witnesses.

A. H. TIMMERMAN. [L. S.]
  E. L. COOLIDGE. [L. S.]
  SIMON SPARROW. [L. S.]

Witnesses:
 VAL. A. FYNN,
 EMILY W. HEUERMAN.